United States Patent [19]

Liu

[11] Patent Number: 5,412,755
[45] Date of Patent: May 2, 1995

[54] OPTICAL IMPLEMENTATION OF INNER PRODUCT NEURAL ASSOCIATIVE MEMORY

[75] Inventor: Hua-Kuang Liu, Pasadena, Calif.

[73] Assignee: The United States of America as represented by the Administrator of the National Aeronautics and Space Administration, Washington, D.C.

[21] Appl. No.: 195,737

[22] Filed: Feb. 8, 1994

Related U.S. Application Data

[63] Continuation of Ser. No. 880,210, Nov. 26, 1991, abandoned.

[51] Int. Cl.$^6$ .............................................. G06F 15/18
[52] U.S. Cl. .................................................... 395/25
[58] Field of Search .................. 395/25; 364/807, 822; 250/201.9

[56] References Cited

U.S. PATENT DOCUMENTS

| | | | |
|---|---|---|---|
| 4,862,406 | 8/1989 | Fisher | 395/25 |
| 4,892,370 | 1/1990 | Lee . | |
| 4,963,725 | 10/1990 | Hong et al. | 395/25 |
| 5,068,801 | 11/1991 | Clark et al. | 364/822 |
| 5,080,464 | 1/1992 | Toyoda | 364/822 |
| 5,090,795 | 2/1992 | O'Meara et al. | 359/189 |
| 5,095,459 | 3/1992 | Ohta et al. | 364/822 |
| 5,113,485 | 5/1992 | Horan et al. | 395/25 |
| 5,121,231 | 6/1992 | Jenkins et al. | 395/25 |

OTHER PUBLICATIONS

Liu, "The Optical Implementation of Inner Product Neural Associative Memory", Proc. of SPIE-Int'l Society of Optical Engineering, Jul. 9–13 1990, vol. 1347 pp. 65–75.
Ishikawa et al. "Optical Association: A Simple Model for Optical Associative Memory", Applied Optics vol. 28 No. 2.
Goff, "Inner Product Implementations of Optical Associative Memories", IEEE 3 vol. 908 & 984 & 974 1990 (CD ROM).

*Primary Examiner*—Allen R. MacDonald
*Assistant Examiner*—Stuart B. Shapairo
*Attorney, Agent, or Firm*—John H. Kusmiss; Thomas H. Jones; Guy M. Miller

[57] ABSTRACT

An optical implementation of an inner-product neural associative memory is realized with a first spatial light modulator for entering an initial two-dimensional N-tuple vector and for entering a thresholded output vector image after each iteration until convergence is reached, and a second spatial light modulator for entering M weighted vectors of inner-product scalars multiplied with each of the M stored vectors, where the inner-product scalars are produced by multiplication of the initial input vector in the first iterative cycle (and thresholded vectors in subsequent iterative cycles) with each of the M stored vectors, and the weighted vectors are produced by multiplication of the scalars with corresponding ones of the stored vectors. A Hughes liquid crystal light valve is used for the dual function of summing the weighted vectors and thresholding the sum vector. The thresholded vector is then entered through the first spatial light modulator for reiteration of the process cycle until convergence is reached.

5 Claims, 3 Drawing Sheets

5,412,755

OPTICAL IMPLEMENTATION OF INNER PRODUCT NEURAL ASSOCIATIVE MEMORY

ORIGIN OF INVENTION

The invention described herein was made in the performance of work under a NASA contract, and is subject to the provisions of Public Law 96-517 (35 USC 202) in which the contractor has elected not to retain title.

This application is a continuation of application Ser. No. 07/880,210, filed Nov. 26, 1991, which is now abandoned.

TECHNICAL FIELD

This invention relates to an associative memory and more particularly to the optical implementation of an inner-product neural network associative memory.

BACKGROUND ART

S. Y. Kung and H. K. Liu proposed a method of implementation of a neural network associative memory via an inner-product array processor in a paper titled "An optical inner-product array processor for associative retrieval," SPIE, Vol. 613, Nonlinear Optics and Applications, pp. 214–219 (1986). H. K. Liu suggested an optical implementation of a programmable associative recall system in a concept paper titled "Real-time optical associative retrieval technique," Optical Engineering, Vol. 25, No. 7, pp. 853–856, July (1986). The main objective was that the processor be implemented in coherent optics as shown in FIG. 1 using the replication capability of a holographic optical element called a multifocus hololens 10 described by Y. Z. Liang in a paper titled "Multifocus dichromated gelatin hololens," Applied Optics, Vol. 22, No 21, pp. 3451–3456, (1986). The inner-products formed are between an N-tuple input vector initially applied via a liquid crystal spatial light modulator 11 and each of a plurality of N-tuple vectors stored in an electronically addressable transmission-type spatial light modulator 12, such as a liquid crystal TV spatial light modulator (LCTV SLM) described by H. K. Liu, et al., "Liquid crystal television spatial light modulators," Applied Optics, Vol 28, No. 22, pp 4772–4780 (1989). The N-tuple vectors are all represented by 2-D image arrays.

The input vector is replicated by the multifocus hololens 10 to provide a number M of input vectors for multiplication with each of M vectors stored in the electronically addressable spatial light modulator 12. The inner products are passed through a diffuser 13 that averages the light intensity of each vector product to yield M inner-product scalars. The scalars are then multiplied by the same M vectors stored in a second spatial light modulator 14 identical to the spatial light modulator 12, thus completing the process of forming the M inner-product vectors (weighted) which are summed by a multifocus hololens 15 that plays a reverse role from the multifocus hololens 10. A television camera (or CCD detector array) 16 detects the output matrix which is then processed through an electronic thresholding means 17. The thresholded matrix is fed back as an input vector through an electronically addressable spatial light modulator 18. This process of producing and feeding back a threshold matrix is reiterated until convergence is reached and the output threshold matrix becomes stable. The stable threshold matrix displayed on a screen 19 is the one of M stored vectors that best matches the initial input vector.

The source of energy for this optical system is an argon laser 20. A lens 21 collimates the laser beam which is then divided by a beam splitter 22. Mirrors 23 and 24 and a beam splitter 25 complete the optical inner-product neural network computation model.

STATEMENT OF THE INVENTION

An object of this invention is to realize an optical implementation of an inner-product neural associative memory that demonstrates with experimental results the feasibility of the conceptual model referred to above. This objective is realized with a first electronically addressable spatial light modulator as a means for entering a two-dimensional N-tuple binary vector $\bar{V}$ at a first multiplication plane, and a second electronically addressable spatial light modulator as a means for entering the output vector matrix of each cycle in search for the best match with one of a number M of N-tuple binary vectors $\bar{V}_i$ stored, where $i=1,\ldots,M$. Optical means respond to the input vector and the stored vectors to form a scalar, $\alpha_i$, of inner products $\bar{V}_i \cdot \bar{V}$ at the first multiplication plane followed by optical means for multiplying each stored vector $\bar{V}_i$ with its corresponding scalar $\alpha_i$ at a second multiplication plane. The weighted matrices $\bar{V}_i \alpha_i$ are detected in parallel and reentered in parallel into the system through the second electronically addressable spatial light modulator as a matrix of weighted vector images $\bar{Y}_i$. Optical means then reflect the weighted vector images $\bar{Y}_i$ onto the input side of means for optically summing the weighted vectors $\bar{Y}_i$ in the matrix and means for thresholding the vector sum $\bar{Z}$ of the weighted vectors $\bar{Y}_i$. The surviving summation vector $\bar{Z}$ is detected and entered as an input vector for the next iteration through the first electronically addressable spatial light modulator. Subsequent iterations continue until the thresholded summation vector $\bar{Z}$ stabilizes. That stabilized vector is the stored vector $\bar{V}_i$ that best matches the initial input vector $\bar{V}_i$.

The novel features that are considered characteristic of this invention are set forth with particularity in the appended claims. The invention will best be understood from the following description when read in connection with the accompanying drawings.

DETAILED DESCRIPTION OF THE INVENTION

Figure 1:
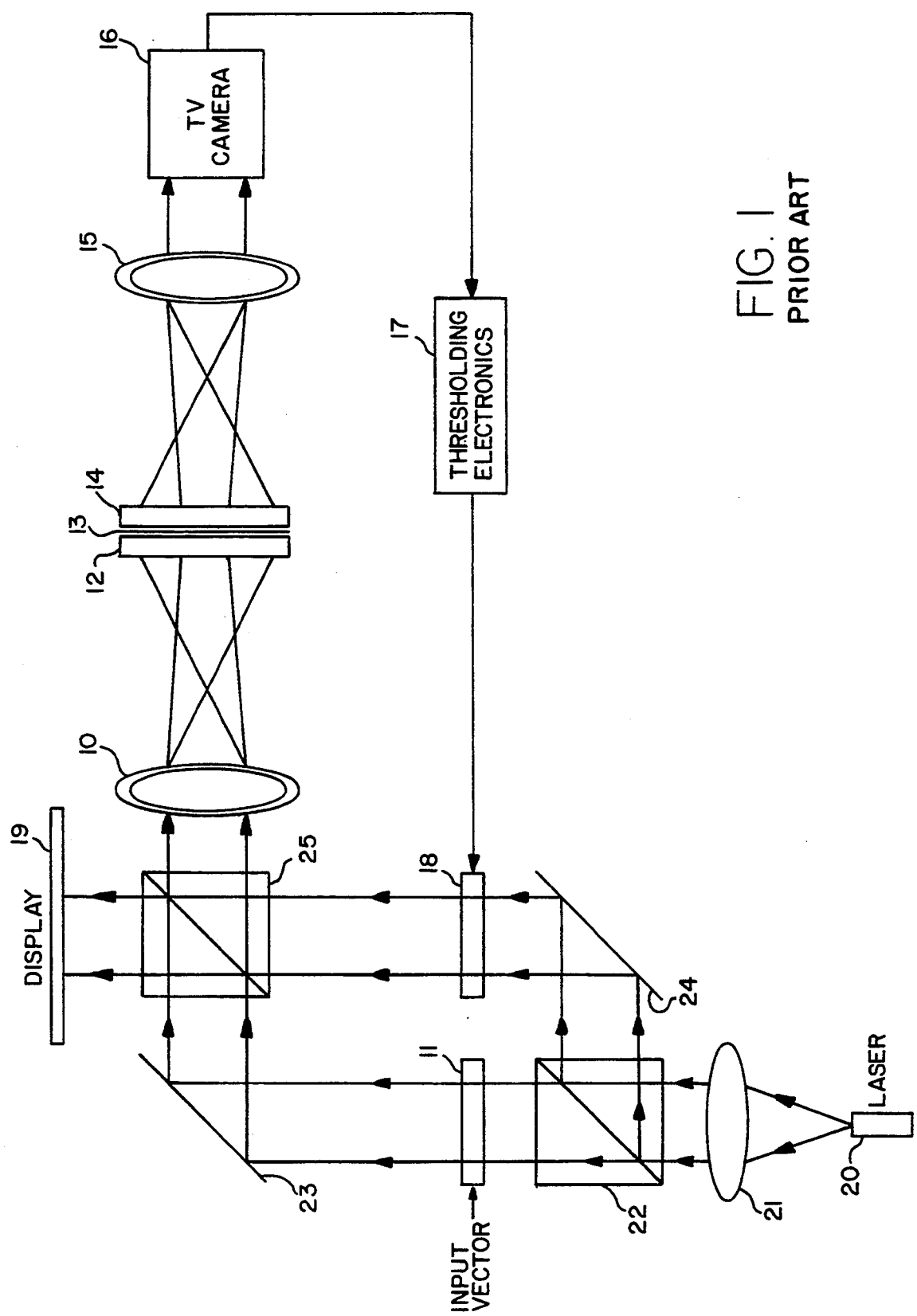
FIG. 1 illustrates the architecture of a prior concept for an optical inner-product neural computation model.

In the following, the theory of the inner-product approach is first briefly reviewed, then the hardware architecture and the experimental results are presented.

The Inner-Product Approach

Assume that an integral number M of N-tuple binary vectors $V_i (i=1,\ldots M)$ are stored in a system where $M < < N$.

A computation model with iteration, thresholding and feedback for the associative retrieval of any one of the stored vectors by an arbitrary input vector was proposed by J. J. Hopfield, "Neural Network and Physical Systems with Emergent Collective Computational Capabilities, "Proc Natl. Acad. Sci., USA, Vol 79, page 2554, et seq., (1982). In the Hopfield model, the vectors are stored in an outer-product matrix:

$$W = \sum_{i=1}^{M} \vec{V}_i \vec{V}_i^t \quad (1)$$

where t denotes the transpose of the vector $\vec{V}_i$.

In the recall process, an arbitrary input $\vec{V}$ is assumed, and the following steps are followed:

Step (1): Vector-matrix multiplication:

$$W \vec{V} = \vec{Z} \quad (2)$$

Step (2): Thresholding by an operator $T_\theta$:

$$\vec{V}^* = T_\theta[\vec{Z}] \quad (3)$$

Step (3): Iteration:

Replace $\vec{V}$ in Equation (2) by $\vec{V}^*$ and continue until convergence is reached.

The above process is referred to as an outer-product process. The optical implementation of the outer-product process was first demonstrated by Psaltis and Farhat, "Optical Information Based on an Associative Memory Model of Neural Nets with Thresholding and Feedback," Optics Lett., Vol. 10, page 98, et seq., (1985).

In contrast to the outer-product approach, an inner-product approach is adopted. The steps of the inner product operation are:

Step (1): Vector-Vector Inner Product Scalar $\alpha$:

$$\alpha_i = \vec{V}_i^t \cdot \vec{V} \quad (4)$$

where $\vec{V}_i^t$ is the ith stored vector, i=1, ... ,M, and $\vec{V}$ is the input vector.

Step (2): Weighting:

$$\vec{Y}_i = \alpha_i \vec{V}_i \quad (5)$$

Step (3): Vector Summation:

$$\vec{Z} = \sum_{i=1}^{M} \vec{Y}_i \quad (6)$$

Step (4): Thresholding

Step (5): Iteration: accomplished by substituting $\vec{Z}$ of Equation (6) in Equation (3) above and then substituting $\vec{V}$ by $\vec{V}^*$ in Equation (4).

The thresholding and iteration operations are similar to those described in the outer-product process. Since the process involves basically the inner-product between the input vector and the M stored vectors, this process is called an inner-product model. An optical implementation of the inner-product model is discussed below as an example of this invention.

EXAMPLE

Figure 2:
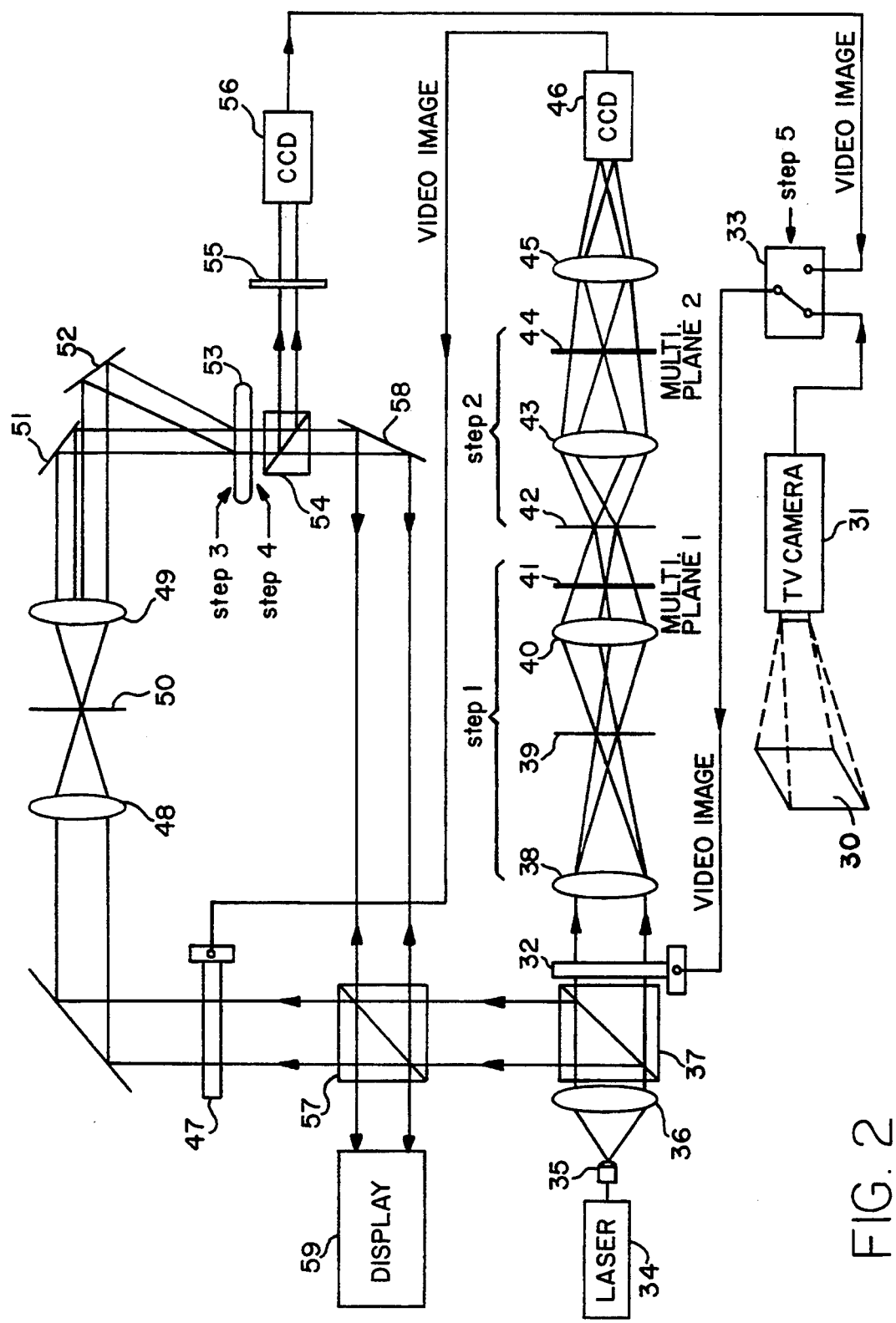
FIG. 2 illustrates the architecture of an optical inner-product neural associative memory.

A diagram of an example of this invention is shown in FIG. 2. The sections involved in the five steps outlined above are indicated in FIG. 2 by the numerals 1, 2, 3, 4 and 5 with brackets and arrows to facilitate an understanding of the invention. The objective of this example was to demonstrate the feasibility of optical implementation of the concept illustrated in FIG. 1. For simplicity, M is chosen to be two while N is chosen to be sixteen. Because of the small number of images stored, a multifocus hololens is not needed to replicate the input vector. A photograph 30 of the input vector $\vec{V}$ is used with a TV camera 31 for entering the initial input vector through an electronically addressable spatial light modulator 32. e.g., a liquid crystal TV spatial light modulator (LCTV SLM) while a switch 33 is in the position shown.

The spatial light modulator 32 is illuminated by a collimated beam from an argon laser 34 via a spreading lens 35, a collimating lens 36, and a beam splitter 37. The image is Fourier transformed by a lens 38 and filtered by two pin holes in a plate 39 to pass the $\pm 1$ orders of the images diffracted by the inherent grid patterns of the spatial light modulator 32. The passed $\pm 1$ orders are re-focused by a subsequent lens 40 and multiplied by two images stored in a transparency 41 placed at a first multiplication plane. This completes the inner-product operation ($\vec{V}_i^t \cdot \vec{V} = \alpha_i$) of step 1.

In practice, this example would not be feasible for a large number M of stored vectors $\vec{V}_i$. If M>2, a Dammann grating would be used as the means for replicating the input vector $\vec{V}$ a number of times equal to M, and in the usual application of the invention, an electronically addressable spatial light modulator would replace the transparency 41 which stores the M vectors $\vec{V}_i$ at the first multiplication plane and a similar spatial light modulator at a second multiplication plane needed in the next step.

A fine grain diffuser 42 is used to convert the inner products $\alpha_i$ into scalars (light intensity spots) which are focused by a lens 43 from the plane where the diffuser 42 is placed onto a transparency 44 at the second multiplication plane referred to above. The focused light spots through the lens 43 represent the scalar quantity $\alpha_i$ of the inner products between the input vector $\vec{V}$ and the stored vectors $\vec{V}_i$. The function of the diffuser is to create uniform light distributions that are proportional to the inner-product scalars. The uniformly distributed scalar light patterns at the second multiplication plane are thus illuminated (weighted) by the vectors $\vec{V}_i$ that are stored in the transparency 44 placed at the second multiplication plane. That multiplication ($\vec{V}_i \alpha_i = \vec{Y}_i$) completes step 2.

The weighted vectors are imaged by a lens 45 onto a CCD camera 46 the video output of which is transmitted to an electronically controlled liquid crystal spatial light modulator 47. The vectors are there illuminated by coherent light from the laser 34 via the beam splitter 37. For the purpose of improving the contrast of the liquid crystal spatial light modulator 47, the vector images are enhanced by lenses 48 and 49 and low-pass filtered by a pin-hole spatial filter 50. However, it should be noted that if a high contrast liquid crystal spatial light modulator is used, this spatial filtering process for enhancement can be omitted. In this example, the contrast enhanced images are then reflected by separate mirrors 51 and 52 that are oriented so that the images are superimposed on the input (writing) side of a Hughes liquid crystal light valve 53 which serves the dual function of optical summation of the vector images at the input side (step 3) and thresholding at the output side (step 4).

The thresholding result of the vector sum at the light valve 53 can be read out from the output side thereof and read out via a beam splitter 54 and an analyzer 55 by another CCD camera 56. A characteristic of the Hughes liquid crystal light valve is that in order for the output to be picked up by the camera 56, the output side must be illuminated. The necessary illumination is provided by the laser 34 via the beam splitter 37, a second beam splitter 57 and a mirror 58. The output can then be picked up by the camera 56 and applied via the switch 33 in its alternate position to the input spatial light modulator 32 (step 5). This completes one iteration of a five step cycle of the inner-product process. Iterative cycles repeat until convergence is reached. Then the image displayed at 59, such as through a television camera and screen, is the vector stored in films 41 and 44 which best matches the input vector. That completes the retrieval from memory of a vector image specified by an imput image.

Experimental Results

The spatial light modulators were implemented with liquid crystal TV (LCTV) spatial light modulation panels having grid patterns for control and polarizers on both sides of the panel. The ±1 diffraction orders of the grid patterns of the LCTV spatial light modulators 32 were used for image replication of an input vector into two vectors. First, the power of the ±1 orders at the spatial filter plate 39 at the filter (Fourier) plane was measured as well as at the second multiplication plane 44. The zero order of the LCTV spatial light modulator 32 was also measured and used as a reference. With a collimated input of 140 mW/cm² kept at constant, the brightness (dc bias) control of the LCTV spatial light modulators 32 was changed from total dark to total bright to see the changes of the ±1 diffraction orders of the grid pattern of the LCTV spatial light modulator 32 and their effects on the ±1 order terms at the weighting multiplication plane 2. The measurement at the plate 39 (Fourier plane) was performed by the expanded beam of the diffracted light at defocused planes and therefore should be treated as relative rather than absolute values. The difference between the two orders shows the nonuniformity of the spatial light modulators 32 and the nonuniformity of the input collimated laser beam. The nonuniformity of the beam propagated through the system and kept the same relative proportionality at the second multiplication plane. It could also be seen that the diffuser 42 reduced the intensity of the beam by about one order of magnitude. In order to correct the difference between the two orders, a thin glass plate serving as a neutral density filter was placed on the stronger order. This was able to make the difference in intensity between the two orders less than about 5%.

A numerical example is shown below, which assumes sufficient iteration cycles for convergence to have taken place. The input vector $\vec{V}_{in}$ made equal to $\vec{V}_a$, and the two stored vectors $\vec{V}_a$ and $\vec{V}_b$ were arranged in the 2-D form as follows:

$$\vec{V}_{in} = \begin{bmatrix} 1 & 0 & 0 & 1 \\ 0 & 1 & 1 & 0 \\ 0 & 1 & 1 & 0 \\ 1 & 0 & 0 & 1 \end{bmatrix},$$

$$\vec{V}_a = \begin{bmatrix} 1 & 0 & 0 & 1 \\ 0 & 1 & 1 & 0 \\ 0 & 1 & 1 & 0 \\ 1 & 0 & 0 & 1 \end{bmatrix},$$

$$\vec{V}_b = \begin{bmatrix} 0 & 1 & 1 & 0 \\ 1 & 1 & 0 & 1 \\ 0 & 0 & 1 & 0 \\ 0 & 1 & 1 & 0 \end{bmatrix},$$

Step 1. Vector Inner Product $\vec{V}_{in} \cdot \vec{V}_a = 8$ $\vec{V}_{in} \cdot \vec{V}_b = 2$ Step 2. Weighting $$8\vec{V}_a = \begin{bmatrix} 8 & 0 & 0 & 8 \\ 0 & 8 & 8 & 0 \\ 0 & 8 & 8 & 0 \\ 8 & 0 & 0 & 8 \end{bmatrix},$$

$$2\vec{V}_b = \begin{bmatrix} 0 & 2 & 2 & 0 \\ 2 & 2 & 0 & 2 \\ 0 & 0 & 2 & 0 \\ 0 & 2 & 2 & 0 \end{bmatrix}$$

Figure 3A:
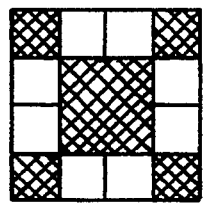
FIGS. 3a, b, c, d and e illustrate 2-D vectors at various stages of the associative retrieval process using the inner-product optical array processor of FIG. 2.
Figure 3B:
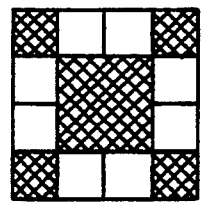
Figure 3C:
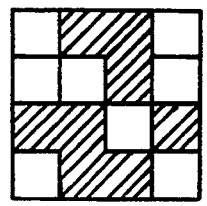

The optical representation of $8\vec{V}_a$ and $2\vec{V}_b$ are shown in FIGS. 3b and c, respectively, as idealized drawings of images obtained by using Polaroid films at the second multiplication plane of FIG. 2. The difference between the idealized drawing of $2\vec{V}_b$ shown in FIG. 3d and the actual photograph of the vector $2\vec{V}_b$ was due to the inversion of the lens. Similar situations occur in other planes as well.

Step 3. Recombination or Summation $$8\vec{V}_a + 2\vec{V}_b = \begin{bmatrix} 8 & 2 & 2 & 8 \\ 2 & 10 & 8 & 2 \\ 0 & 8 & 10 & 0 \\ 8 & 2 & 2 & 8 \end{bmatrix},$$

Figure 3D:
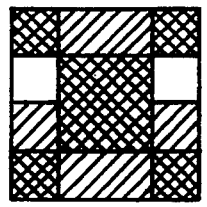

This result is represented by the idealized drawing shown in FIG. 3d of a photograph taken at the input side (or writing side) of the Hughes liquid crystal light valve 53 shown in FIG. 2.

Step 4. Thresholding

Figure 3E:
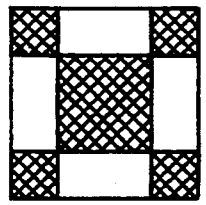

The photoactivated liquid crystal light valve 53 produced by Hughes Aircraft Company may not be the best thresholding device due to its limited gamma value. It was nevertheless used to close the loop of computation. Another device for thresholding that may be used is a microchannel spatial light modulator available from Hammamazu. Other reflective or transmissive optical or optoelectronic devices may be or may become available for this thresholding function. The ideal result of thresholding is shown in FIG. 3e. The stored vector of FIG. 3b was retrieved in the example described above.

In the example, $\vec{V}_{in}$ was made equal to $\vec{V}_a$. In another example, $\vec{V}_{in}$ was made equal to $\vec{V}_b$. Note that the major difference is that, since $\vec{V}_{in} \cdot \vec{V}_a = 2$ not 8 and $\vec{V}_{in} \cdot \vec{V}_L = 8$ not 2, the ratio is 1:4 instead 4:1. The comparable results corresponding to the various steps agreed with those illustrated as expected in the computations.

It has thus been shown that an optical implementation for the inner-product model is feasible, especially in view of the availability of ferroelectric liquid crystal spatial light modulators and magneto-optical spatial light modulators produced by Semetex, although the higher quality LCTV spatial light modulator was used in the example. Any of these spatial light modulators may be used to replace the films 41 and 44 used as optical means for storing M vectors. The light through such spatial light modulators is not a problem since only a fraction of the laser output power was used so as not to cause saturation in the CCD cameras used as detectors. Other types of detectors may be employed, such as a vidicon television camera equipped with static registers for storing a video freeze frame. Uniform illumination and replication of the input vector to a number M greater than 2 can be achieved by any optical means for replicating two-dimensional vectors, such as the multifocus hololens referred to above or a phase grating. The system performs the associative memory retrieval function well.

I claim:

1. An optical inner-product neural associative memory for retrieving the best match between an initial input two-dimensional N-tuple binary vector $\bar{V}$ and a number M of stored two-dimensional N-tuple binary vectors $\bar{V}_i$, where $i=1,\ldots,M$, each binary element of said two dimensional N-tuple binary vectors $\bar{V}$ and $\bar{V}_i$ being represented by a binary optical value, comprising:

a source of coherent light;

a first optical storage means for storing said number M of two-dimensional N-tuple binary vectors $\bar{V}_i$ at a first multiplication plane;

a first spatial light modulator responsive to said coherent light for entering a vector image of said initial input two-dimensional N-tuple binary vector $\bar{V}$ in search of a best match with one of said number M of stored two-dimensional N-tuple binary vectors $\bar{V}_i$;

optical means at said first multiplication plane responsive to said initial input two-dimensional N-tuple binary vector and said number M of two-dimensional N-tuple binary vectors stored in said first optical storage means for forming an inner-product scalar $\alpha_i$ as a beam of light for each of said stored number M of two-dimensional N-tuple binary vectors;

a second optical storage means at a second multiplication plane for storing said number M of two-dimensional N-tuple binary vectors as corresponding vectors;

means at said second multiplication plane for weighting each of said number M of two-dimensional N-tuple binary vectors stored in said second optical storage means by multiplication of each of said number M of two-dimensional N-tuple binary vectors stored in said second optical storage means by said inner-product scalar beam of light to produce a number M of two-dimensional weighted vectors;

a second spatial light modulator;

means for detecting each of said number M of two-dimensional weighted vectors;

means for entering a vector image of each of said number M of two-dimensional weighted vectors through said second spatial light modulator;

means for optically summing said number M of two-dimensional weighted vectors and optically thresholding the sum of said number M of two-dimensional weighted vectors in order to produce a two-dimensional binary vector that is an approximation of one of said stored two-dimensional N-tuple binary vectors; and means for entering said two-dimensional binary vector produced as an approximation of one of said stored two-dimensional binary vectors by said means for optically summing and thresholding as an input binary vector into said optical inner-product neural associative memory through said first spatial light modulator to commence another iterative cycle corresponding to the same cycle of operations performed with said initial input two-dimensional N-tuple binary vector, and to recommence subsequent iterations until convergence is reached between said initial input two-dimensional N-tuple vector and a best match with one of said number M of two-dimensional N-tuple binary vectors stored in said first and said second optical storage means.

2. An optical inner-product neural associative memory as defined in claim 1 including means associated with said means for optically summing and thresholding for reading out of said means for optically summing and thresholding said best match with one of said number M of two-dimensional N-tuple binary vectors stored in said first and second optical storage means once said convergence is reached.

3. An optical inner-product neural associative memory as defined in claim 2 wherein:

said means for optically summing and thresholding said two-dimensional weighted vectors comprises an optical device and an array of mirrors oriented for so reflecting vector images as to be superimposed on one surface of said optical device which serves a dual function of optical summation of vectors incident on said one surface thereof, and thresholding by operating on said optical summation of vectors as an inherent limitation on the amplitude of the sum of said optical summation of vectors transmitted by said optical device to a surface of said optical device opposite said one surface thus producing on said opposite surface a thresholded two-dimensional binary vector that is a composite of two or more stored vectors until sufficient iterative cycles have been completed for convergence to have occurred, at which time the thresholded sum of said optical summation of vectors is stable and known to be a best match between said input two-dimensional N-tuple binary vector $\bar{V}$ and one of said number M of stored two-dimensional N-tuple binary vectors $\bar{V}_1$, and said means associated with said optical summing and thresholding means for reading out said best match with one of said number M of two-dimensional N-tuple binary vectors stored in said first and second optical storage means includes means for illuminating said surface of said optical device opposite said one surface thereof to read out as an optical image said thresholded two-dimensional binary vector which, when stable, is known to be said best match with one of said number M of two-dimensional N-tuple binary vectors stored in said first and second optical storage means.

4. An optical inner-product neural associative memory as defined in claim 1 wherein said means for entering a vector image of each of said number M of two-dimensional weighted vectors through said second spatial light modulator includes means for enhancing vector image contrast of vector images produced through said second spatial light modulator.

5. An optical inner-product neural associative memory as defined in claim 4 wherein said means for enhancing vector image contrast of said vector images produced through said second spatial light modulator comprises a pair of lenses and a pin-hole spatial filter between said pair of lenses.

* * * * *